US006385202B1

(12) United States Patent
Katseff et al.

(10) Patent No.: US 6,385,202 B1
(45) Date of Patent: *May 7, 2002

(54) METHOD AND SYSTEM FOR ALLOWING ACCESS TO TRADITIONAL VOICE MAIL AND INTERACTIVE VOICE RESPONSE SYSTEMS OVER INTERNET-LIKE NETWORKS

(75) Inventors: Howard Paul Katseff, Englishtown; K Hal Purdy, Bernardsville; Bethany Scott Robinson, Lebanon, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,426

(22) Filed: Oct. 1, 1997

(51) Int. Cl.[7] .......................... H04L 12/56; H04L 12/66
(52) U.S. Cl. ...................... 370/401; 370/352; 370/525
(58) Field of Search ................................ 370/461, 352, 370/400, 356, 354, 355, 351, 389, 401, 468, 525; 379/219, 88.13, 93.08, 93.03, 361, 283, 88.22, 93.27, 114.19, 58, 142, 100.25, 88.19, 93.32, 207; 707/104, 6, 206; 709/227; 710/73, 10; 340/825.44, 114, 283; 704/270, 209; 455/575, 41, 426; 600/300; 235/380, 379; 375/222

(56) References Cited

U.S. PATENT DOCUMENTS

| 4,866,759 | A | * | 9/1989 | Riskin | 379/93.27 |
|---|---|---|---|---|---|
| 5,031,206 | A | * | 7/1991 | Riskin | 379/93.27 |
| 5,522,089 | A | * | 5/1996 | Kikinis et al. | 710/73 |
| 5,592,538 | A | * | 1/1997 | Kosowsky et al. | 379/93.08 |
| 5,604,737 | A | * | 2/1997 | Iwami et al. | 370/352 |
| 5,608,786 | A | | 3/1997 | Gordon | 370/352 |
| 5,682,421 | A | * | 10/1997 | Glovitz et al. | 379/100.05 |
| 5,737,395 | A | * | 4/1998 | Irribarren | 379/88.13 |
| 5,742,596 | A | * | 4/1998 | Baratz et al. | 370/356 |
| 5,790,644 | A | * | 8/1998 | Kikinis | 379/114.19 |
| 5,802,526 | A | * | 9/1998 | Fawcett et al. | 707/104 |
| 5,841,842 | A | * | 11/1998 | Baum et al. | 379/93.32 |
| 5,870,464 | A | * | 2/1999 | Brewster et al. | 379/219 |
| 5,884,262 | A | * | 3/1999 | Wise et al. | 704/270 |
| 5,905,448 | A | * | 5/1999 | Briancon et al. | 340/825.44 |
| 5,907,597 | A | * | 5/1999 | Mark | 379/93.03 |
| 5,953,392 | A | * | 9/1999 | Rhie et al. | 379/88.13 |
| 5,974,449 | A | * | 10/1999 | Chang et al. | 709/206 |
| 5,991,292 | A | * | 11/1999 | Focsaneanu et al. | 370/352 |
| 6,009,469 | A | * | 12/1999 | Mattaway et al. | 709/227 |
| 6,236,717 | B1 | * | 5/2001 | Bremer et al. | 379/88.22 |
| 6,256,630 | B1 | * | 7/2001 | Gilai et al. | 707/6 |

FOREIGN PATENT DOCUMENTS

WO    WO 97/28628    7/1997

* cited by examiner

Primary Examiner—Hassan Kizou
Assistant Examiner—John Pezzlo
(74) Attorney, Agent, or Firm—Morgan & Finnegan, LLP

(57) ABSTRACT

A method and system for accessing a remote system via a computer connected to a packet data network, comprises a Packet Data Network Gateway (PDNG) is connected to the packet data network. The PDNG receives a signal representing a DTMF tone transmitted from the computer, generates the DTMF tone at corresponding to the received signal, and transmits the generated DTMF tone to the remote system. The PDNG receives a response from the remote system and creates at least one voice packet for transmission to the computer over the packet data network. The remote system may be a voice messaging system or an interactive voice response (IVR) system.

21 Claims, 2 Drawing Sheets

METHOD AND SYSTEM FOR ALLOWING ACCESS TO TRADITIONAL VOICE MAIL AND INTERACTIVE VOICE RESPONSE SYSTEMS OVER INTERNET-LIKE NETWORKS

BACKGROUND OF THE INVENTION

1. Field of the Invention

The present invention relates to voice messaging and interactive voice response (IVR) systems and, more particularly, to the interaction with voice messaging and IVR systems in an Internet-like environment.

2. Description of the Related Art

Voice mail and Interactive Voice Response (IVR) systems have become a nearly ubiquitous feature of telephony usage in the U.S. Access to public data networks such as the Internet has also increased greatly in recent years.

Currently, there is a product available which allows two Internet-connected multimedia computers to establish and conduct a telephone call over a packet data network such as the Internet. This particular product has limited usefulness because it requires the computers to possess certain high-end capabilities and thus is not appropriate for many computer users.

Further, one characteristic of current Internet telephony, whether computer-to-computer or computer-to-POTS (plain old telephone service) telephone is that it can be of low quality, particularly with respect to the transmission delays encountered by the voice signals. This delay, called "latency," is predominantly due to the transmission characteristics of packet data networks such as the Internet. It is also important to note that the transport protocol used to transmit voice in Internet telephony products today is UDP, an unreliable, non-session oriented protocol. To summarize, the methods traditionally employed for digital data transmission over packet data networks such as the Internet are not the best-suited methods for transmitting real-time voice over the Internet. Conversely, the best methods for real-time voice transmission are not well-suited to digital data transmission and are also more complicated than digital data transfer methods.

FIG. 1 depicts a conventional real-time voice transmission system for connecting a computer via a packet data network, such as the Internet, with traditional public switched telephone network (PSTN) services using a traditional Internet Telephony Gateway Platform (ITGP). A POTS (plain old telephone service) telephone 100 is connected via a PSTN 110 to a voice mail (VM) system 120 and an Interactive Voice Response (IVR) system 130. A multimedia computer 160 is connected to the Internet 150, which is in turn connected to the ITGP 140, which ITGP is linked to the PSTN 110. A system such as that shown in FIG. 1 would not be ideal for a user wishing to perform voice mail retrieval or IVR functions using a computer via a packet data network because the real-time voice protocol is not optimized for digital signal transmission (necessary for IVR and voice mail retrieval) and is also needlessly complicated for functions which do not require real-time voice transmission.

A further disadvantage of traditional ITGPs is that a technical compromise must be struck with respect to the size of the receiver buffer queue. Since there can be large amounts of jitter (the variance in delay of sound packet arrival times) in a general packet network, it is desirable to make a large receiver buffer queue which holds many of the incoming sound packets before they are played out through the speakers to the user. However, to limit the amount of delay in the conversation, it is desirable to keep the receiver buffer small. This leads to a tradeoff which can compromise system performance.

Traditional ITGPs use voice coders/decoders (codecs) to digitize and compress the speech being carried across the packet network. Frequently, to attain maximum compression, these codecs make assumptions about the sound signal upon which they operate, namely that the sound signal is a voice rather than any other arbitrary signal (e.g., music). Consequently, using a traditional ITGP, if a user depresses a button on the keypad of a touchtone telephone to generate a DTMF tone, the compression of the non-voice audio signal is generally not as accurate as it would be if handled by a system optimized for digital tones. Due to the degraded nature of the transmission of DTMF tones, if the receiving end of the telephone connection is an IVR or voice mail system, the apparatus for detecting DTMF tones may fail to operate properly. Moreover, since traditional ITGPs and Internet Telephony users make no distinction between voice and DTMF tones, the DTMF tones are encoded as if they were voice and therefore use the same bandwidth on the network connection as if voice were being transmitted.

Traditional ITGPs may not allow DTMF tones to be transmitted at all once a conversation starts. If they do, it is usually accomplished by typing in a digit at a keyboard or by clicking on a graphical representation of a telephone keypad on a computer screen. For the purposes of Internet Telephony, the capabilities of the client computer are therefore on par with the capabilities of a traditional telephone.

Another method of computer-based retrieval of voice mail, described by Gordon in U.S. Pat. No. 5,608,786, uses a unified messaging system that collects a user's messages, either e-mail, voice mail, or fax, in one central location and enables them to be retrieved via remote computer. This method does not allow access to traditional PSTN voice mail, but rather provides a separate collection system for voice and other messages and therefore requires equipment and services above and beyond traditional PSTN voice mail and a user's personal computer.

SUMMARY OF THE INVENTION

In accordance with the present invention, there is provided a method and system for accessing a remote system via a computer connected to a packet data network. A Packet Data Network Gateway (PDNG) is connected to the packet data network. The PDNG receives a signal representing a DTMF tone transmitted from the computer, generates the DTMF tone at corresponding to the received signal, and transmits the generated DTMF tone to the remote system. The PDNG receives a response from the remote system and creates at least one voice packet for transmission to the computer over the packet data network. The remote system may be a voice messaging system or an interactive voice response (IVR) system.

It is not intended that the present invention be summarized here in its entirety. Rather, further features, aspects and advantages of the present invention are set forth in or are apparent from the following description and drawings.

BRIEF DESCRIPTION OF THE DRAWINGS

The foregoing features and other aspects of the invention are explained in the following description taken in connection with the accompanying drawings wherein.

DETAILED DESCRIPTION

Figure 1:
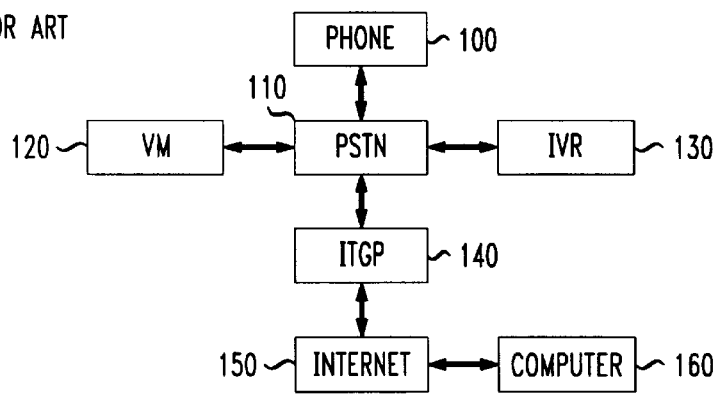
FIG. 1 is a block diagram of a system for connecting a computer via the Internet with traditional PSTN voice services using a traditional Internet Telephony Gateway Platform (ITGP)
Figure 2:
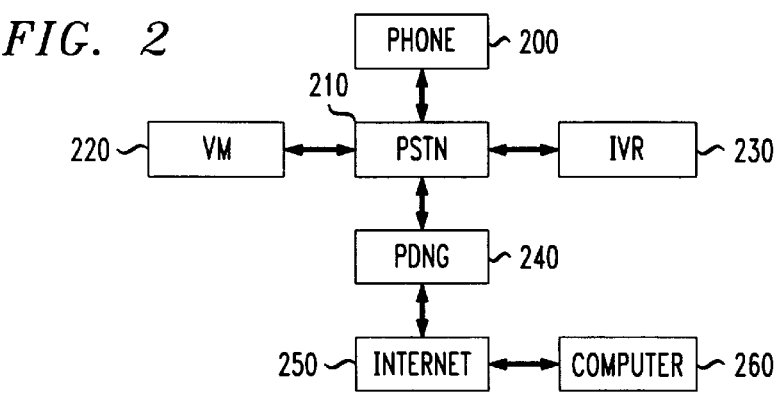
FIG. 2 is a block diagram of a system in accordance with the present invention for connecting a computer via the Internet with traditional PSTN voice mail and Interactive Voice Response Systems using the Packet Data Network Gateway (PDNG)

Referring now to the drawings, and in particular to FIG. 2, there is depicted a block diagram of a system for connecting a computer 260 via a packet data network (such as the Internet) 250 with traditional PSTN voice mail (VM) 220 and Interactive Voice Response (IVR) systems 230 using the Packet Data Network Gateway (PDNG) 240. A POTS telephone 200 is preferably connected via the PSTN 210 to voice mail 220 and IVR 230 systems. A multimedia computer 260 is preferably connected via the Internet 250 to the PDNG 240, which is linked to the voice mail 220 and IVR 230 systems through the PSTN 210.

FIG. 2 illustrates an embodiment of the invention in which individuals may both send and receive voice mail from either the Internet 250 or the PSTN 210. This is accomplished because the PDNG 240 combines the functions of the required Internet Telephony Gateway Platform which translates signals between the Internet 250 and the PSTN 210 with some additional functionality enabling more reliable and convenient access to traditional IVR and voice mail servers. Using the present invention, the servers can therefore provide access to voice mailboxes either through the Internet 250 or through the more traditional means of a POTS telephone 200 with keypad.

Figure 3:
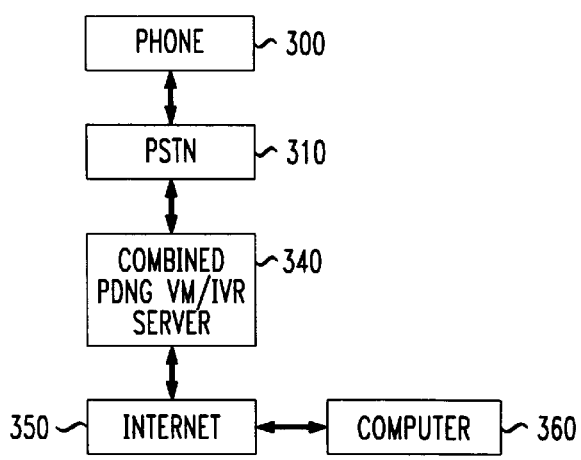
FIG. 3 is a block diagram of a system in accordance with the present invention for connecting a computer via the Internet with traditional PSTN voice mail and Interactive Voice Response Systems using the Packet Data Network Gateway (PDNG) directly integrated with the voice mail and IVR servers.

An alternative embodiment is shown in FIG. 3 in which the PDNG 340 is directly integrated with the voice mail and IVR servers, thereby establishing a direct connection between the PDNG 340 and PSTN 310.

Figure 4:
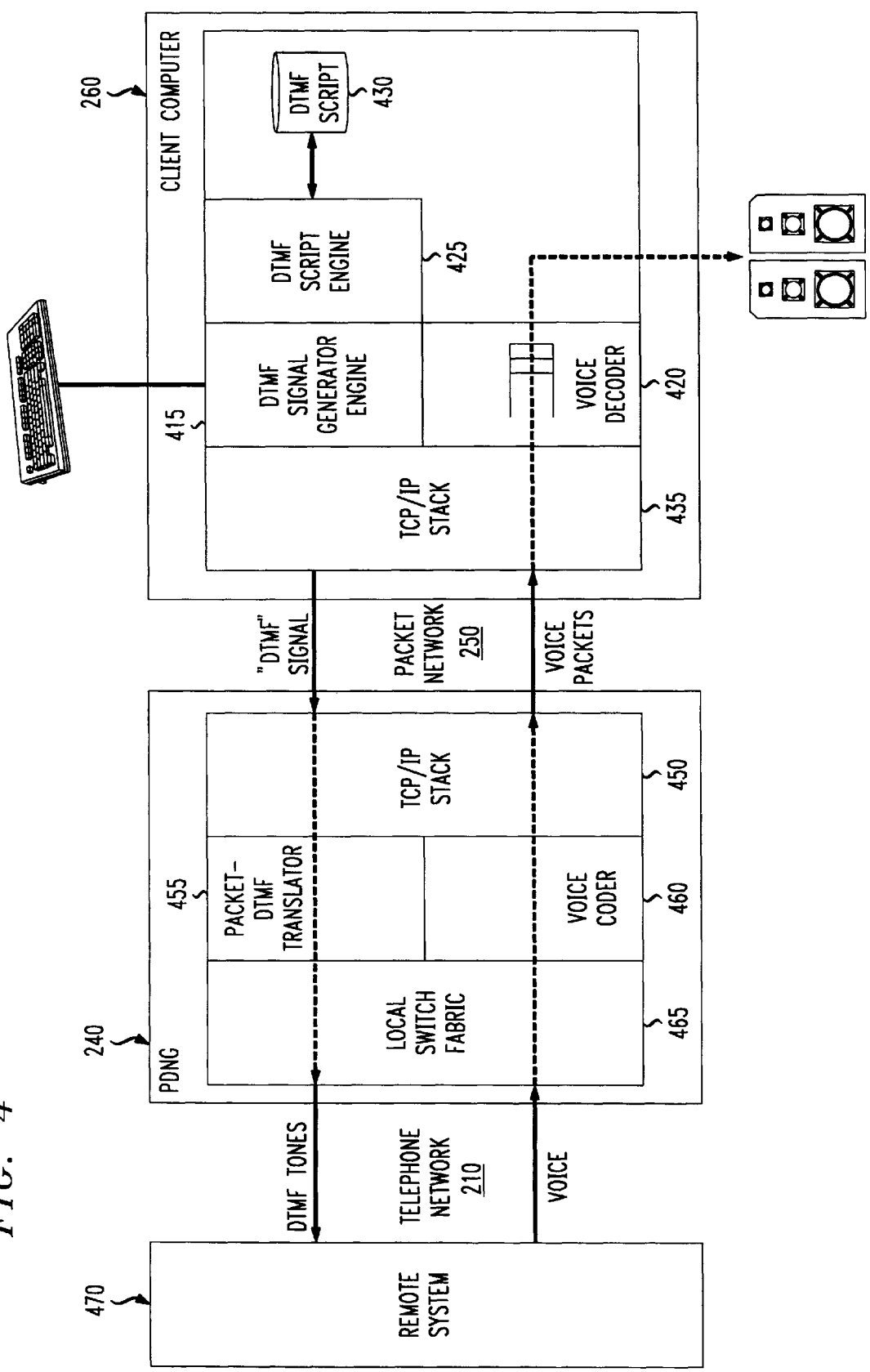
FIG. 4 is a more detailed block diagram illustrating some of the elements of the invention depicted in FIG. 2.

FIG. 4 is a more detailed block diagram of the computer 260 and PDNG 240 of FIG. 2. Referring to FIG. 4, the client computer 260 includes a DTMF signal generator engine 415, a voice decoder with receiver buffer queue 420, a DTMF script engine 425, DTMF script storage unit 430, and TCP/IP stack 435. DTMF signals and voice packets are sent to the PDNG 240 using the packet network 250. The PDNG 240 includes a TCP/IP stack 450, a Packet-DTMF Translator 455, a voice coder 460, and local switch fabric 465. The PDNG 240 is connected to a remote IVR or voice mail system 470 by a PSTN 210 which transmits DTMF tones and voice.

Recall that a disadvantage of traditional ITGPs is that a technical compromise must be struck with respect to size of the receiver buffer queue 420. Since the present invention is tailored to interaction with IVR and voice mail systems, it can take advantage of the fact that such interactions do not generally involve real-time voice conversations. In general, IVR and voice mail systems are characterized by a human user listening to pre-recorded ("canned") speech and responding to the voice prompts by entering one or more DTMF tones through the telephone keypad. In this realm, a larger delay in the playback of the recorded voice prompts is not as noticeable or bothersome to the user as it would be in a real-time conversation. Hence, with the present invention, the receiver buffer queue size 420 can be large to maximize the system's tolerance to jitter in the inter-arrival times of the sound packets.

Since voice mail retrieval and IVR services require the transmission of digital tones, but do not require real-time voice transmission, the present invention takes advantage of the digital data transmission protocols, such as TCP, available on packet data networks such as the Internet to provide high-quality interaction between the computer and the voice mail and IVR systems without the needless complexity and less-than-optimum performance of real-time voice transmission systems which have traditionally been used for this purpose and which are not optimized for digital tones.

According to an aspect of the present invention, when a user signals for the transmission of DTMF tones to the remote IVR or Voice Mail System 470, the local client computer 260 captures those tones so that such tones are not coded and compressed by a codec as in a traditional ITGP. Instead, using the present invention, logic on the client computer 260 sends logical symbols to the PDNG 240 which represent the information contained in the DTMF tone from the DTMF signal generator engine 415. For example, instead of digitizing and compressing the two sound frequencies corresponding to the DTMF tone associated with the "1" key on a touchtone keypad, a client using the present invention could send the ASCII symbol "1" to the packet/DTMF translator 455 in the PDNG 240. When the translator 455 receives the "1" packet from the computer 260, it recognizes that this symbol corresponds to a DTMF tone, and locally generates the DTMF tone for transmission over the PSTN 210 to the remote IVR/Voice Mail system 470. There are additional benefits associated with this approach:

the bandwidth consumed to send the signal representing a DTMF tone is much less than the bandwidth used by a traditional ITGP which compresses an audio signal to achieve the same result; and the DTMF tone may be sent on a reliable channel (i.e., TCP session), rather than using an unreliable channel (i.e., UDP) as is used by most ITGPs when sending voice.

According to a further aspect of the present invention, the user is able to use the DTMF script engine 425 and DTMF script storage device 430 in the computer 260 to build and record scripts which capture a sequence of touchtones, thereby allowing the automation of access to IVR or voice mail systems 470. The invention also encompasses the concept that the execution of such scripts may be initiated automatically by the computer 260 with the results stored for later use by the user. This aspect of the invention saves time and reduces error as compared to manual DTMF tone entry without feedback.

Another advantage of the present invention is that it would be useful for people living outside the U.S. who communicate a great deal with people within the U.S. and would like to use voice mail services with U.S. residents. International subscribers may purchase any voice mail service which allows people in the U.S. to leave messages in the voice mailbox. The international subscribers could then retrieve the messages over the Internet.

The present invention provides at least two advantages for the international subscriber. First, if access to the subscriber's mailbox is at no cost to the subscriber (e.g., through an 800 number), then the international subscriber is able to make use of an 800-like service even though such services are not offered in the country in which the subscriber resides. Second, the cost of access to packet data networks such as the Internet is traditionally inexpensive and insensitive to geographical distances. To the extent that this remains true, international subscribers may communicate with U.S. residents using voice mail and IVR services at a much lower price than what is currently available to them.

In addition, U.S. businesses are offering an increasing number of services to their customers with IVR systems. Even though these services are usually available domestically via an 800 number, international customers must place an expensive international call to take advantage of these services. In accordance with the present invention, international subscribers can have full access to IVR services offered in the U.S. and this access is only as expensive as the cost borne by the international subscriber for Internet access.

Most IVR and voice mail systems make heavy use of touchtones as user input for menu navigation and entry of data (e.g., account numbers, telephone numbers, order codes). Since there is no immediate, useful feedback of the tones entered, the process of entering DTMF tones is error-prone. Moreover, when entering DTMF tones with a telephone device, the tones are sent immediately upon actuation of the keypad button. Since the present invention allows a multimedia Internet-connected computer to act as a telephone for the purposes of IVR and voice mail access, the process of entering touchtones can be greatly improved for the user in the following manner. Sequences of touchtones can be represented visually in a window on the computer display. The user can take advantage of all the editing capability associated with data entry on a computer (e.g., backspace, cut and paste). When the user is satisfied with the visual representation of the touchtones to be sent, a button is actuated and the DTMF tones are transmitted to the remote IVR or voice mail system. Further, since this process is carried out entirely in the digital domain, the problems inherent in transmitting digital tones using real-time voice protocols are avoided.

Navigation through sophisticated IVR and voice mail systems is often slow and confusing. Even when the desired information or transaction is accomplished by a user once, the same user may have trouble finding the information or transaction at a later date. In accordance with the principles of the present invention, a user with an Internet-connected computer may build and record a script which stores the sequence and timing of transmitted DTMF tones for subsequent use. By creating stored scripts using the DTMF script engine 425 and DTMF script storage device 430, a user can quickly and automatically have access to information or transactions in IVR and/or voice mail systems. Moreover, once such scripts are written, they may be invoked automatically by the computer based on a timer without requiring user intervention. Such a feature would be very useful for voice mail service subscribers since the cost of many of these services is based on the amount of voice mail to be stored on the host voice mail system. Using automatic voice mail retrieval scripts, a user may periodically retrieve voice mail to a local system and avoid paying for extra voice mail storage on the host voice mail system. This feature would also be useful for unified messaging where the user would like all of the messages, be they fax, e-mail or voice mail, to be accessible in one place. Using the automatic voice mail retrieval in accordance with the present invention, the user can integrate voice mail into a unified messaging approach without requiring the various systems themselves (e-mail, fax, voice mail) to be integrated.

By integrating the voice mailbox functionality with the Packet Data Network Gateway (PDNG), sending or receiving voice mail can be accomplished via either the packet data network or the PSTN. By using interfaces appropriate to the packet data network medium with a computer, the interface for leaving and receiving voice mail can be made as appealing and user-friendly as existing Windows and Web applications. Unlike purely Internet-based messaging, however, voice mail may still be accessible from any telephone by means of the touchtone techniques used for traditional accessing of voice mail systems.

The present invention addresses a service area that circumvents some of the more difficult issues associated with Internet telephony, namely latency, jitter, unreliability, and fire walls associated with transmission of real-time audio over a public data network such as the Internet. The data being transmitted for access to voice mail and IVR systems is either touchtone or pre-recorded (i.e., non-real time) voice. Several techniques can be used to ensure quality and reliability of the transmission of voice and/or touchtones over a packet data network:

DTMF/touchtones are sent by means of a guaranteed no-loss, guaranteed in-sequence transport protocol such as TCP.

Transmission of voice mail messages can also be accomplished by means of a guaranteed, no-loss, guaranteed in-sequence protocol such as TCP. This has the additional advantage that a TCP-based network connection is more likely to be able to pass through an Internet fire wall than are UDP-based existing Internet telephony products.

Effective use of limited bandwidth, such as that experienced with modem use, is ensured since voice mail messages being retrieved over a packet data network can be encapsulated in large data packets. In this manner, the bandwidth overhead associated with each packet sent over the Internet is minimized.

The problems associated with jitter in a data network used for voice transmission can be avoided by increasing the size of the buffer space on the receiving computer which is dedicated to "staging" the voice just before it is transmitted to the speakers heard by the user.

In summary, the Packet Data Network Gateway (PDNG) of the present invention provides computer access to traditional voice mail and IVR services using a packet data network such as the Internet. Since voice mail retrieval and IVR services require the transmission of digital tones but do not require real-time voice transmission, the present invention takes advantage of the digital data transmission protocols, such as TCP, available on packet data networks such as the Internet to provide high-quality interaction between the computer and the voice mail and IVR systems without the needless complexity and less-than-optimum performance of real-time voice transmission systems which have traditionally been used for this purpose and which are not optimized for digital tones.

Further, the present invention provides for automation of the voice mail retrieval/IVR interaction by enabling the user to create automated scripts which can perform the desired functions on a pre-determined schedule without requiring further user intervention. This is not only convenient, but can also be economical because many voice mail services charge a fee for message storage. In contrast, using the present invention, the user's voice mail can be retrieved and stored on the user's computer, free of charge, until the user is ready to access the messages.

Additionally, the use of a computer with keypad and display for interacting with traditional voice mail or IVR systems provides immediate feedback on the user's data entries before they are transmitted. This helps reduce error and saves time.

Another advantage of the present invention is that the cost of accessing a traditional voice mailbox is limited to the cost of packet data network access. Thus, international subscribers to U.S. voice mail systems may retrieve their messages or leave messages for other U.S. subscribers without the need for placing an expensive international telephone call.

Yet another advantage of the present invention is that it enables the user to unify voice messaging with other computer-based types of messaging, such as e-mail and fax, without requiring the user to give up the flexibility of traditional voice mail. While currently available computer-based systems for voice mail retrieval involve the conversion of the data to digital format at delivery, the present invention doesn't convert the information until it is accessed. In this manner, the retrieval may be optimized according to the method of retrieval; if traditional PSTN voice mail retrieval is used, the information need not be converted to digital format. If the voice mail is retrieved via computer using the present invention, the information is converted to digital format at the time of retrieval.

Although an illustrative embodiment of the present invention, and various modifications thereof, have been described in detail herein with reference to the accompanying drawings, it is understood that the present invention is not limited to the precise embodiment and described modifications, and that various changes and further modifications may be effected therein by one skilled in the art without departing from the scope or spirit of the invention as defined in the appended claims.

We claim:

1. A method of accessing a remote system via a computer connected to a packet data network, the packet data network also connected to a Packet Data Network Gateway (PDNG), the method comprising the steps of:

receiving a symbol at the PDNG transmitted from the computer, the symbol representative of, but not a coded form of, a DTMF tone;

generating the DTMF tone via a packet DTMF translator at the PDNG corresponding to the received symbol;

transmitting the DTMF tone from the PDNG to the remote system for interacting with the DTMF tones for control of the remote system;

receiving a response in DTMF tones at the PDNG from the remote system; and creating at least one voice packet at the PDNG for transmission to the computer over the packet data network.

2. The method according to claim 1, further comprising the steps of:

receiving the voice packet at the computer;

decoding the voice packet; and displaying the response on the computer.

3. The method according to claim 1, wherein the remote system is a voice messaging system responsive to the DTMF tones.

4. The method according to claim 1, wherein the remote system is an interactive voice response (IVR) system responsive to the DTMF tone.

5. The method according to claim 3, further comprising the step of unifying collection of voice, e-mail, and fax messages.

6. A method of accessing a remote system via a computer connected to a packet data network, comprising:

receiving DTMF tones;

converting DTMF tones to symbols representative of, but not a coded form of, the DTMF tones;

establishing a communication path for the symbols between the packet data network and a packet data network gateway, the packet data network gateway being capable of converting the symbols back to the DTMF tones via a packet DTMF translator; and communicating with a DTMF tone responsive device for control purposes of the remote system via the packet data network gateway.

7. The method according to claim 6, wherein the remote system is connected to a public-switched telephone network.

8. The method according to claim 6, wherein the remote system is a voice messaging system.

9. The method according to claim 6, wherein the remote system is an interactive voice response (IVR) system.

10. The method according to claim 6, further comprising the steps of incorporating a voice messaging server within the packet data network gateway and connecting the voice message server to a public-switched telephone network.

11. The method according to claim 6, further comprising the steps of incorporating an interactive voice response server within the packet data network gateway and connecting the voice message server to a public-switched telephone network.

12. The method according to claim 6, further comprising the step of communicating with the remote system by executing automatic scripts generating DTMF tones.

13. The method according to claim 6, further comprising the step of automatically communicating with the remote system according to a predetermined schedule.

14. The method according to claim 6, further comprising the step of obtaining computer feedback of data entries before transmission.

15. The method according to claim 6, further comprising the step of storing sequences of data for later use.

16. An apparatus for accessing a remote system connected to a telecommunications network using a computer connected to a packet data network, comprising: a packet data network gateway (PDNG) connected to the packet data network and the telecommunications network, the PDNG adapted to generate and transmit to the remote system a DTMF tone for control purposes of a remote system and corresponding to a symbol representative of, but not a coded form of, the DTMF tone received from the computer via a packet DTMF translator and to create at least one voice packet corresponding to a response received from the remote system for transmission to the computer over the packet data network.

17. The apparatus according to claim 16, wherein the remote system is a voice messaging system.

18. The apparatus according to claim 16, wherein the remote system is an interactive voice response system.

19. The apparatus according to claim 16, wherein the computer comprises a dual-tone multi-frequency (DTMF) signal generator engine communicating with a DTMF script engine, a DTMF script storage unit, and a TCP/IP stack which is connected to a packet data network and a receiver buffer queue with voice decoder.

20. The apparatus according to claim 16, wherein the packet data network gateway comprises a TCP/IP stack, a packet DTMF translator, a voice coder and a local switch fabric.

21. The apparatus according to claim 16, wherein the remote system is incorporated within the packet data network gateway.

* * * * *